(12) United States Patent
Takaoka

(10) Patent No.: US 9,541,020 B2
(45) Date of Patent: Jan. 10, 2017

(54) ENGINE CONTROLLER

(71) Applicant: SUZUKI MOTOR CORPORATION, Hamamatsu-Shi, Shizuoka-Ken (JP)

(72) Inventor: Atsushi Takaoka, Hamamatsu (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 15/019,099

(22) Filed: Feb. 9, 2016

(65) Prior Publication Data

US 2016/0153379 A1 Jun. 2, 2016

Related U.S. Application Data

(63) Continuation of application No. PCT/JP2015/062814, filed on Apr. 28, 2015.

(30) Foreign Application Priority Data

May 13, 2014 (JP) ................................. 2014-099916

(51) Int. Cl.
| | |
|---|---|
| *B60T 7/12* | (2006.01) |
| *F02D 41/06* | (2006.01) |
| *F02N 11/08* | (2006.01) |
| *F02D 41/10* | (2006.01) |
| *F02D 41/24* | (2006.01) |
| *F02P 5/152* | (2006.01) |

(Continued)

(52) U.S. Cl.
CPC ............. *F02D 41/062* (2013.01); *F02D 41/10* (2013.01); *F02D 41/2422* (2013.01); *F02N 11/0848* (2013.01); *F02P 5/1521* (2013.01); *F02D 29/02* (2013.01); *F02D 41/0225* (2013.01); *F02D 2200/604* (2013.01); *F02D 2250/21* (2013.01)

(58) Field of Classification Search
CPC . G01M 15/00; F02D 2009/0247; F02D 41/24; F02N 11/08
USPC .................................. 701/101, 112, 114, 115
See application file for complete search history.

(56) References Cited

U.S. PATENT DOCUMENTS

| | | | | |
|---|---|---|---|---|
| 6,256,573 | B1 * | 7/2001 | Higashimata | ...... B60K 31/0008 180/167 |
| 2002/0170758 | A1 * | 11/2002 | Shimabukuro | .......... B60K 6/48 180/65.25 |

(Continued)

FOREIGN PATENT DOCUMENTS

| | | |
|---|---|---|
| JP | 2001-323864 A | 11/2001 |
| JP | 2010-163958 A | 7/2010 |

(Continued)

OTHER PUBLICATIONS

International Search Report dated Jun. 9, 2015.

*Primary Examiner* — John Kwon
(74) *Attorney, Agent, or Firm* — Barnes & Thornburg LLP

(57) ABSTRACT

An engine controller is proposed which facilitates an operation at start of a vehicle without forcing mental strain to a rider to cancel start control. An engine controller includes a start determinator for determining start of a vehicle, an elapsed time after start timer for counting elapsed time Tp since start of the vehicle is determined by the start determinator, and a start controller for adjusting an output of an engine until the elapsed time Tp counted by the elapsed time after start timer reaches a predetermined control time Tr determined in advance if the start of the vehicle is determined by the start determinator.

7 Claims, 11 Drawing Sheets

(51) Int. Cl.
  *F02D 29/02* (2006.01)
  *F02D 41/02* (2006.01)

(56) References Cited

U.S. PATENT DOCUMENTS

| 2004/0162186 A1* | 8/2004 | Takatori | F16H 61/061 477/121 |
| 2008/0119328 A1* | 5/2008 | Satou | B60W 10/02 477/181 |
| 2009/0319141 A1* | 12/2009 | Suzuki | F16H 61/061 701/58 |

FOREIGN PATENT DOCUMENTS

| JP | 2010-216297 A | 9/2010 |
| JP | 2015-040527 A | 3/2015 |

* cited by examiner

ENGINE CONTROLLER

CROSS-REFERENCE TO RELATED APPLICATION

This application is a Continuation Application of No. PCT/JP2015/062814, filed on Apr. 28, 2015, and the PCT application is based upon and claims the benefit of priority from Japanese Patent Application No. 2014-099916, filed on May 13, 2014, the entire contents of which are incorporated herein by reference.

FIELD

The present invention relates to an engine controller.

BACKGROUND

An engine controller is known in which, when two conditions, that is, a throttle opening degree of an engine and a gear position of a transmission connected to the engine are in a start running state determined in advance, and when a start switch is operated to be switched on, ignition timing of the engine is delayed and gripping performances of a tire at start of a vehicle is improved (see Patent Document 1).

PRIOR ART DOCUMENTS

Patent Document

Patent Document 1 Japanese Patent Laid-Open No. 2001-323864

SUMMARY

Problems to be Solved by the Invention

A prior-art engine controller has a start detector which detects a start running state of a vehicle and an ignition timing controller for delaying an ignition timing of an engine when the start running state is detected by the start running detector. Specifically, the prior-art start detector detects that the state enters the start running state when a throttle opening degree is ½ or less and a gear position is at a third gear or less. The ignition timing controller delays the ignition timing on the basis of detection of the start detector.

However, the prior-art engine controller does not detect the start running state any longer if a state in which the throttle opening degree exceeds ½ or the gear position exceeds the third gear starts after the detection of the start running state and cancels control of the ignition timing controller for delaying the ignition timing and returns the ignition timing of the engine to a normal state.

That is, in the prior-art engine controller, in order to continue the control for delaying the ignition timing with the purpose of improvement of gripping performances of a tire at start of the vehicle, a rider needs to continue an operation of keeping the throttle opening degree to ½ or less. In other words, the prior-art engine controller cannot allow such a rider who opens the throttle large at the start in order to achieve a fast start dash to utilize delay control of the ignition timing.

Therefore, the prior-art engine controller not only forces mental strain to keep the throttle opening degree to ½ or less to the rider who seeks the gripping performances of at the start control but also the control for delaying the ignition timing is cancelled and cannot be used any longer and acceleration performances of the vehicle itself cannot be fully brought out.

Thus, the present invention proposes an engine controller which can easily bring out the acceleration performances of the vehicle itself without giving mental strain even to a rider who opens the throttle large at the start.

Means for Solving the Problems

In order to solve the aforementioned problems, the engine controller according to the present invention includes a start determinator for determining whether or not the vehicle has started, an elapsed time after start timer for measuring elapsed time since start of the vehicle determined by the start determinator, and a start controller for adjusting an engine output until the elapsed time measured by the elapsed time after start timer reaches a control time determined in advance if the start of the vehicle is determined by the start determinator.

Moreover, the start determinator of the engine controller according to the present invention starts the determination if the conditions that a start control request switch has been operated, that a gear position of a transmission connected to the engine is at a stage lower than a gear position determined in advance, and that a rotation speed of the engine is within a rotation speed range determined in advance are all satisfied.

Moreover, the start determinator of the engine controller according to the present invention determines that the vehicle has started if a drop rate of the rotation speed of the engine is larger than a drop rate determined in advance.

Moreover, the start determinator of the engine controller according to the present invention suppresses start determination of the vehicle if the rotation speed of the engine reaches or over an upper limit rotation speed determined in advance or more.

Moreover, the start determinator of the engine controller according to the present invention suppresses start determination of the vehicle if a throttle opening degree of the engine is smaller than a throttle lower limit opening degree determined in advance in accordance with the engine rotation speed.

Moreover, the start controller of the engine controller according to the present invention finishes control for adjusting the engine output even before the elapsed time measured by the elapsed time after start timer reaches the control time if the gear position of the transmission connected to the engine changes to the gear position determined in advance or more.

Moreover, the start controller of the engine controller according to the present invention finishes the control for adjusting the engine output even before the elapsed time measured by the elapsed time after start timer reaches the control time if a state in which the throttle opening degree of the engine becomes substantially fully closed reaches fully-closed duration determined in advance.

Moreover, the engine controller according to the present invention has a plurality of correction maps for adjusting the engine output, and the start controller selects the correction map in accordance with an operation of the start control request switch and sets the control time measured by the elapsed time after start timer.

The start controller of the engine controller according to the present invention notifies a state of engine output adjustment control for adjusting the engine output or a situation of the engine rotation speed satisfying an execution condition of the engine output adjustment control by lighting-on or a flashing pattern of an indicator lamp.

Advantages of the Invention

According to the present invention, regarding a control operation of a driving torque to a driving wheel at the start, the engine controller which can easily bring out the acceleration performances of the vehicle itself at the start of the vehicle can be provided without giving mental strain to the rider.

DETAILED DESCRIPTION

An embodiment of an engine controller according to the present invention will be described below by referring to FIGS. 1 to 11.

Figure 1:
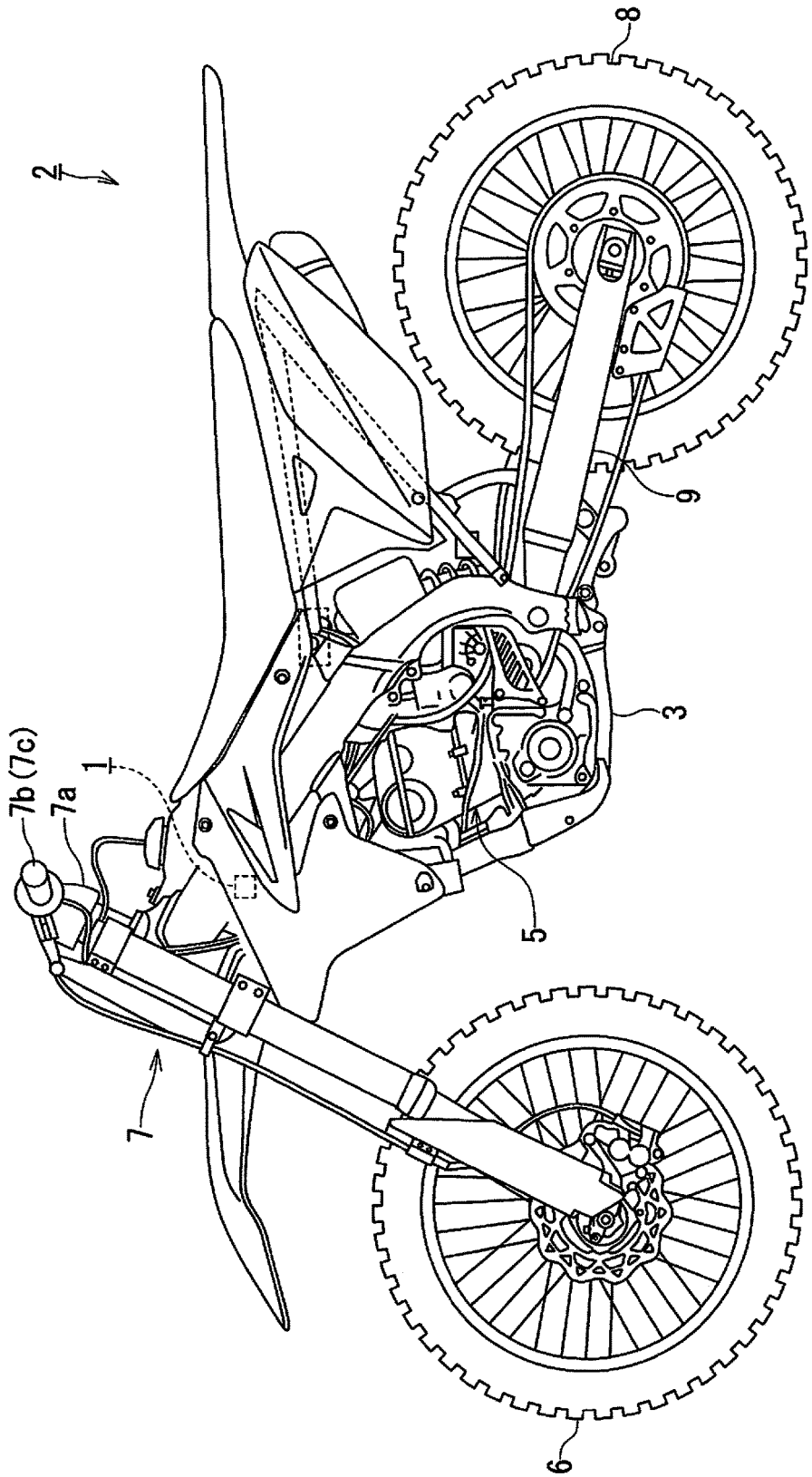
FIG. 1 is a side view illustrating a vehicle to which an engine controller according to an embodiment of the present invention is applied.

FIG. 1 is a side view illustrating a vehicle to which the engine controller according to the embodiment of the present invention is applied.

As illustrated in FIG. 1, a vehicle 2 to which an engine controller 1 according to this embodiment is applied is a so-called motorcycle. The vehicle 2 includes a vehicle body 3 extending in a longitudinal direction, an engine 5 mounted on the vehicle body 3, a front wheel 6 as a steering wheel arranged on a front of the vehicle body 3, a steering mechanism 7 supporting the front wheel 6 on the vehicle body 3 capable of steering, a rear wheel 8 as a driving wheel arranged on a rear of the vehicle body 3, and a swing arm 9 supporting the rear wheel 8 on the vehicle body 3 capable of swing in a vertical direction.

A steering mechanism 7 includes a handle bar 7a extending to right and left of the vehicle 2 and a pair of grips 7b and 7c on right and left of the handle bar 7a.

The vehicle 2 is an off-road type motorcycle but this is not limited and there may be other types of motor cycles such as an on-road type or a scooter type motorcycle.

The engine controller 1 adjusts an output of the engine 5 until it detects start of the vehicle 2, and a control time Tr determined in advance is reached. The engine controller 1 will be described later in detail.

Figure 2:
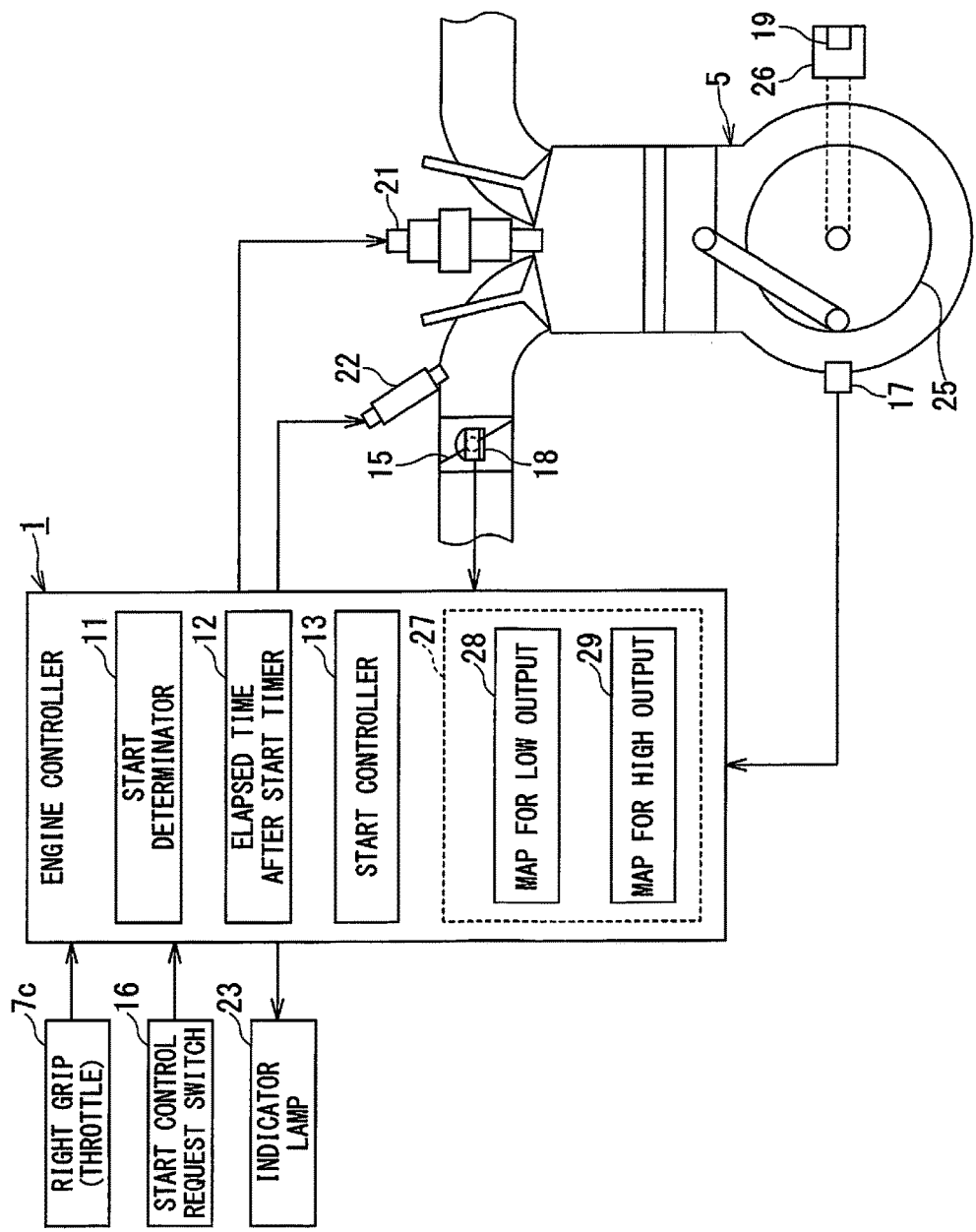
FIG. 2 is a block diagram illustrating the engine controller according to the embodiment of the present invention.

FIG. 2 is a block diagram illustrating the engine controller according to the embodiment of the present invention.

As illustrated in FIG. 2, the engine controller 1 according to this embodiment includes a start determinator 11 for determining whether or not the vehicle 2 has started, an elapsed time after start timer 12 for counting elapsed time Tp after the start of the vehicle 2 is determined by the start determinator 11, and a start controller 13 for adjusting an output of the engine 5 until the elapsed time Tp counted by the elapsed time after start timer 12 reaches a control time Tr determined in advance when start of the vehicle 2 is determined by the start determinator 11.

Moreover, the engine controller 1 includes a microprocessor (not shown) and a storage (not shown) storing various calculation programs executed by the microprocessor, parameters and the like. The start determinator 11, the elapsed time after start timer 12, and the start controller 13 are programs stored in the storage in advance and they are read out of the storage and executed by the microprocessor. The microprocessor and the storage may be a processing circuit exclusive for the engine controller 1.

Control by the engine controller 1 for adjusting an output of the engine 5 shall be referred below to simply as "engine output adjustment control". The engine output adjustment control adjusts the output of the engine 5 by combining thinning misfire of ignition or delay of ignition timing, advance of the ignition timing, a decrease or increase of a fuel injection amount, adjustment of an opening degree of a throttle valve 15 by an electronically controlled throttle in addition to the output control of the engine 5 by a map by an ignition timing.

The engine controller 1 receives a signal from a start control request switch 16, a crank rotation pulse generator 17, a throttle opening degree sensor 18, and a gear position sensor 19 and transmits the signal to an igniter 21, an injector 22, and an indicator lamp 23.

First, the start control request switch 16 is an input device for selecting whether or not to execute the engine output adjustment control at start of the vehicle 2 and is also an input device for selecting what engine output adjustment control is to be executed. Whether or not the engine output adjustment control is to be executed at start of the vehicle 2 and what engine output adjustment control is to be executed are called a control mode altogether.

The engine controller 1 receives an input when the start control request switch 16 is pressed long and executes the engine output adjustment control at start of the vehicle 2 in order to prevent an input by a mis-operation of the start control request switch 16, for example. The start control request switch 16 is provided close to either one of right and left grips 7b and 7c. An installation space cannot be ensured easily around the right grip 7c (throttle) since there are a throttle cable (not shown) and the like, but in the case of the left grip 7b, there is an installation space of the start control request switch 16, which is advantageous. In the embodiment of the present invention, the start control request switch 16 is mounted close to the left grip 7b of the handle bar 7a.

The crank rotation pulse generator 17 is provided in the engine 5 and measures a rotation speed Ne of a crank shaft 25 and outputs it to the engine controller 1.

The throttle opening degree sensor 18 measures an opening degree θ of the throttle valve 15 provided in an intake system of the engine 5 (hereinafter referred to simply as the "throttle opening degree θ") and outputs it to the engine controller 1.

The gear position sensor 19 detects a gear position (shift position) GP of a transmission 26 connected to the engine 5. In the case of the 5-speeds transmission 26, for example, the gear position sensor 19 detects which gear position from a first gear to a fifth gear is selected in a state in which a driving force from the engine 5 is transmittable to the rear wheel 8, or whether a neutral position is selected in a state in which the driving force of the engine 5 is not transmitted to the rear wheel 8.

The igniter 21 ignites and fires an air mixture compressed by the engine 5. The engine controller 1 controls ignition timing of the engine 5 by controlling the igniter 21. The injector 22 injects a fuel to an intake of the engine 5. The engine controller 1 controls concentration of the air mixture by adjusting a fuel injection amount through control of the injector 22. The engine controller 1 executes the engine output adjustment control through control of the igniter 21 and the injector 22, that is, control of the ignition timing of the engine 5 and concentration of the air mixture.

The indicator lamp 23 is a light source such as an LED or a light bulb. The engine controller 1 notifies various types of information relating to the vehicle 2 and the engine controller 1 of at least one person of a rider and an assistant by turn on or flashing the indicator lamp 23. The indicator lamp 23 may notify the various types of information relating to the vehicle 2 and the engine controller 1 by changing an emitted color in addition to turning-on, flashing and turning-off. In the embodiment according to the present invention, the indicator lamp 23 is arranged on an operation panel (not shown) on which the start control request switch 16 is mounted. Specifically, the indicator lamp 23 is arranged on the right side of the start control request switch 16 arranged close to the left grip 7b and arranged at a position not hidden by the operation of the start control request switch 16 by the left hand.

Moreover, the engine controller 1 has a plurality of ignition timing correction maps 27 determined by a relation between the rotation speed Ne of the engine 5 and the throttle opening degree θ in addition to an ordinary standard ignition timing map determined by a relation between the rotation speed Ne of the engine 5 and the throttle opening degree θ. The ignition timing correction map 27 determines a correction amount for correcting the standard ignition timing of the engine 5 by the relation between the rotation speed Ne of the engine 5 and the throttle opening degree θ in accordance with the control mode selected by the start control request switch 16. Specifically, the engine controller 1 has a map 28 for a low output for keeping the output of the engine 5 lower than the standard ignition timing and a map 29 for a high output for increasing the output of the engine 5 higher than the standard ignition timing as the ignition timing correction map 27. In the embodiment according to the present invention, an example in which a plurality of ignition timing correction maps 27 are provided is illustrated, but it may be so configured that a plurality of correction maps for increasing or decreasing a concentration of the air mixture by adjusting a standard fuel injection amount used for normal control, that is, a map for a low output for decreasing the output of the engine 5 and a map for a high output for increasing the output of the engine 5 may be provided. Moreover, the output of the engine 5 may be adjusted by correcting the ignition timing and the fuel injection amount at the same time.

The engine controller 1 switches the use of the correction map and the ignition timing correction map 27 to start the engine output adjustment control at start of the vehicle 2 in the requested control mode on the basis of an input of the start control request switch 16 if the engine 5 is started and the transmission 26 is at any one of a neutral position, a first gear, and a second gear and the engine rotation speed Ne is lower than an allowing map selection rotation speed Nea determined in advance (3500 rpm, for example). The engine controller 1 switches between applying ignition timing correction map 27 or not applying the ignition timing correction map 27 depending on a length of duration of a long-pressing-down operation on the start control request switch 16.

Figure 3:
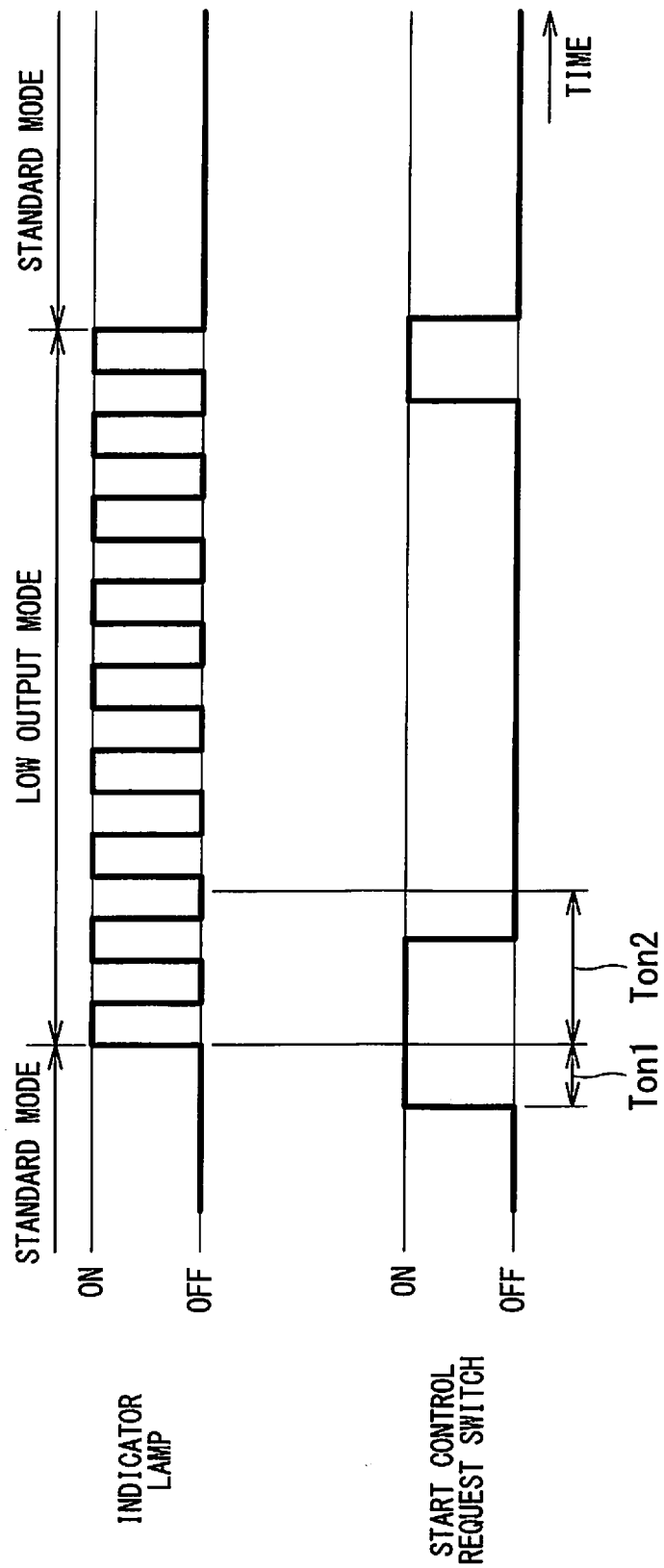
FIG. 3 is a timing chart illustrating switching of an ignition timing correction map by the engine controller according to the embodiment of the present invention.
Figure 4:
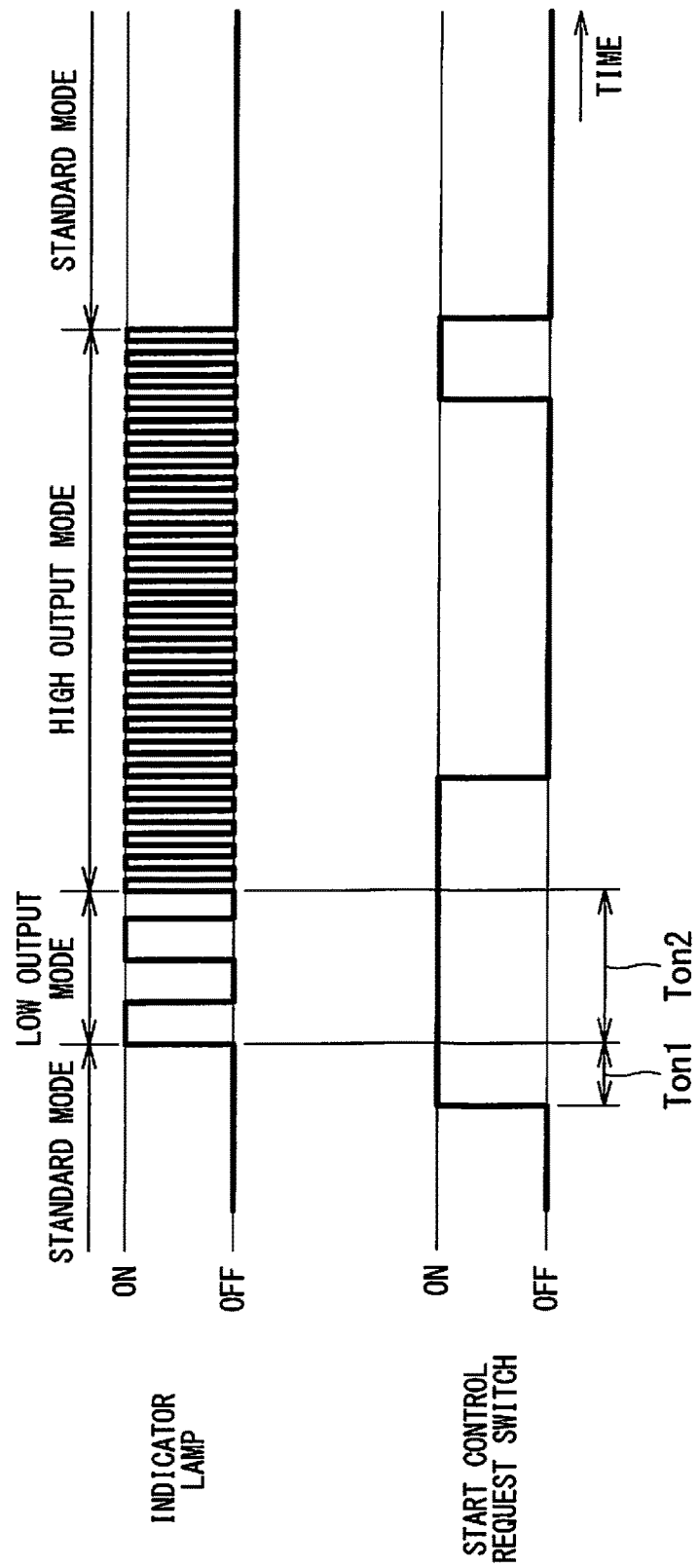
FIG. 4 is a timing chart illustrating switching of an ignition timing correction map by the engine controller according to the embodiment of the present invention.

FIG. 3 and FIG. 4 are timing charts illustrating switching of the ignition timing correction map by the engine controller according to the embodiment of the present invention.

As illustrated in FIG. 3, the engine controller 1 according to this embodiment controls the engine 5 by applying the map 28 for a low output for keeping the output of the engine 5 lower than the standard ignition timing which is a first ignition timing correction map when first input duration Ton1 determined in advance has elapsed since the start control request switch 16 was pressed and also notifies the rider or the assistant that the map was switched to the map 28 for a low output by flashing the indicator lamp 23. After the first input duration Ton1 has elapsed, if the pressing-down operation on the start control request switch 16 is cancelled within second input duration Ton2 determined in advance, the engine controller 1 confirms application of the map 28 for a low output and notifies the rider or the assistant by continuing flashing of the indicator lamp 23 that the engine output adjustment control by the map 28 for a low output is to be executed. The control mode of the engine 5 in which the map 28 for a low output is applied is referred to as a low output mode. In the low output mode, the ignition timing is delayed than standard so as to suppress the engine output and suppress idling of the rear wheel 8 at start, whereby a start operation can be facilitated and the start acceleration performances can be improved.

Moreover, as illustrated in FIG. 4, when the first input duration Ton1 determined in advance has elapsed since the start control request switch 16 is pressed, the engine controller 1 according to this embodiment causes the indicator lamp 23 to be flashed and notifies the rider or the assistant that the map was switched to the map 28 for a low output. After that, if the second input duration Ton2 determined in advance has elapsed while the pressing-down operation on the start control request switch 16 continues, the engine controller 1 confirms application of the map 29 for a high output which increases the output of the engine 5 higher than the standard ignition timing as a second ignition timing correction map and notifies the rider or the assistant that the map was switched to the map 29 for a high output by flashing the indicator lamp 23 in a shorter cycle than that when the map 28 for a low output was selected. When the pressing-down operation on the start control request switch 16 is cancelled after the second input duration Ton2 determined in advance has elapsed, the engine controller 1 notifies the rider or the assistant that the engine output adjustment control by the map 29 for a high output is to be executed by continuing flashing of the indicator lamp 23 in the short cycle. The control mode of the engine 5 in which the map 29 for a high output is applied is referred to as a high output mode. In the high output mode, the ignition timing is advanced than the standard so as to increase the engine output so that a driving torque transmittable to the rear wheel 8 at start can be increased and the start acceleration performances can be improved.

If the start control request switch 16 is not pressed or if the pressing-down operation on the start control request switch 16 does not reach the first input duration Ton1, the engine controller 1 operates the engine 5 at the standard ignition timing without applying the ignition timing correction map 27 and turns off the indicator lamp 23. The control mode of the engine 5 in which the ignition timing correction map 27 is not applied is referred to as a standard mode.

Moreover, as illustrated in FIG. 3 and FIG. 4, if the ignition timing correction map 27 is selected by the operation of the start control request switch 16, and the engine output adjustment control is applied to the engine 5, and after the pressing-down operation on the start control request switch 16 is finished, if the start control request switch 16 is pressed again, the engine controller 1 according to the embodiment of the present invention cancels the application of the ignition timing correction map 27 and returns the mode to the standard mode and notifies the rider or the assistant by turning off the indicator lamp 23 that the ignition timing correction map 27 has not been selected and thus, the ignition timing correction map 27 is not to be applied. In more detail, after the pressing-down operation on the start control request switch 16 for selecting the ignition timing correction map 27 and applying the engine output adjustment control to the engine 5 is finished, even if any one of the ignition timing correction map 27 is selected or applied, when the start control request switch 16 is subjected to the pressing-down operation again and this pressing-down operation is finished (canceled), switching of the operation control to the engine 5 at the standard ignition timing and turning-off of the indicator lamp 23 are performed.

Subsequently, the output adjustment control of the engine 5 executed by the engine controller 1 at the start of the vehicle 2 will be described in detail. The engine output adjustment control is executed when the control mode of the engine 5 is in the low output mode or in the high output mode other than the standard mode.

Figure 5:
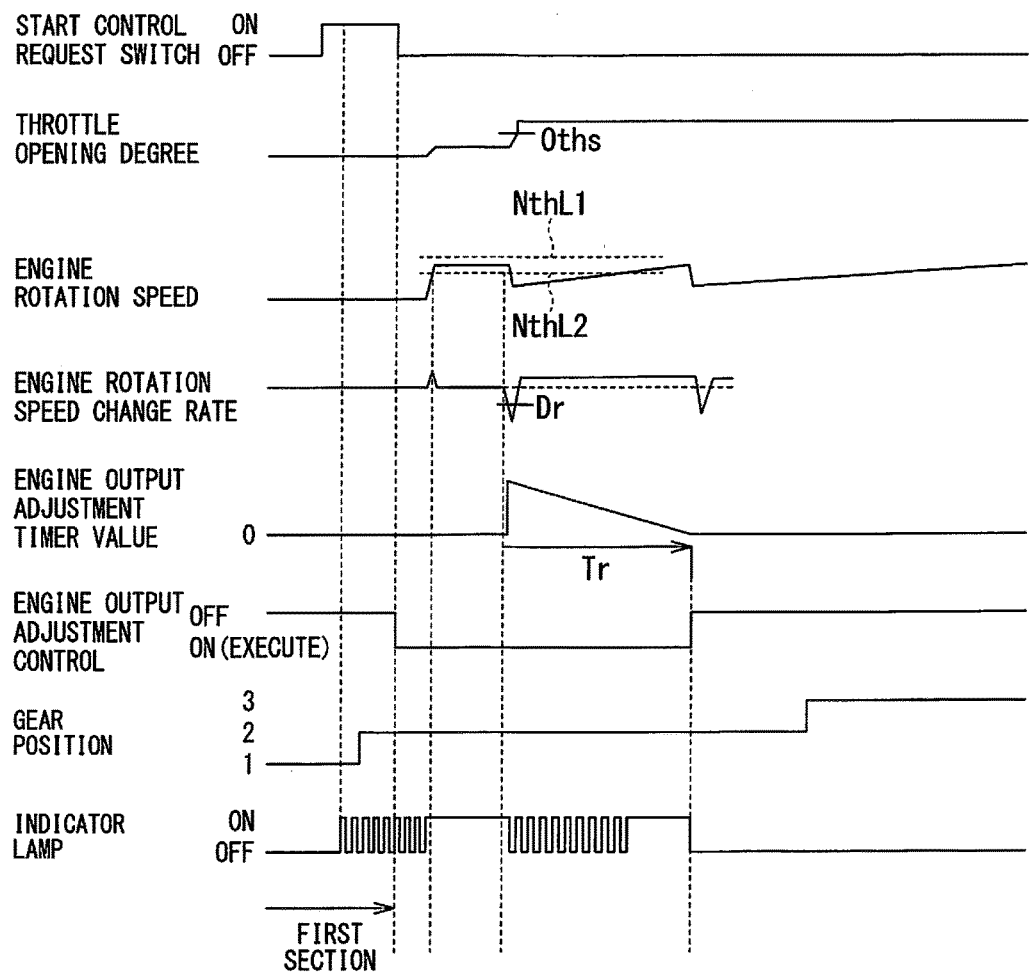
FIG. 5 is a timing chart in the engine output adjustment by the engine controller according to the embodiment of the present invention.

FIG. 5 is a timing chart illustrating the engine output adjustment by the engine controller according to the embodiment of the present invention.

Figure 6:
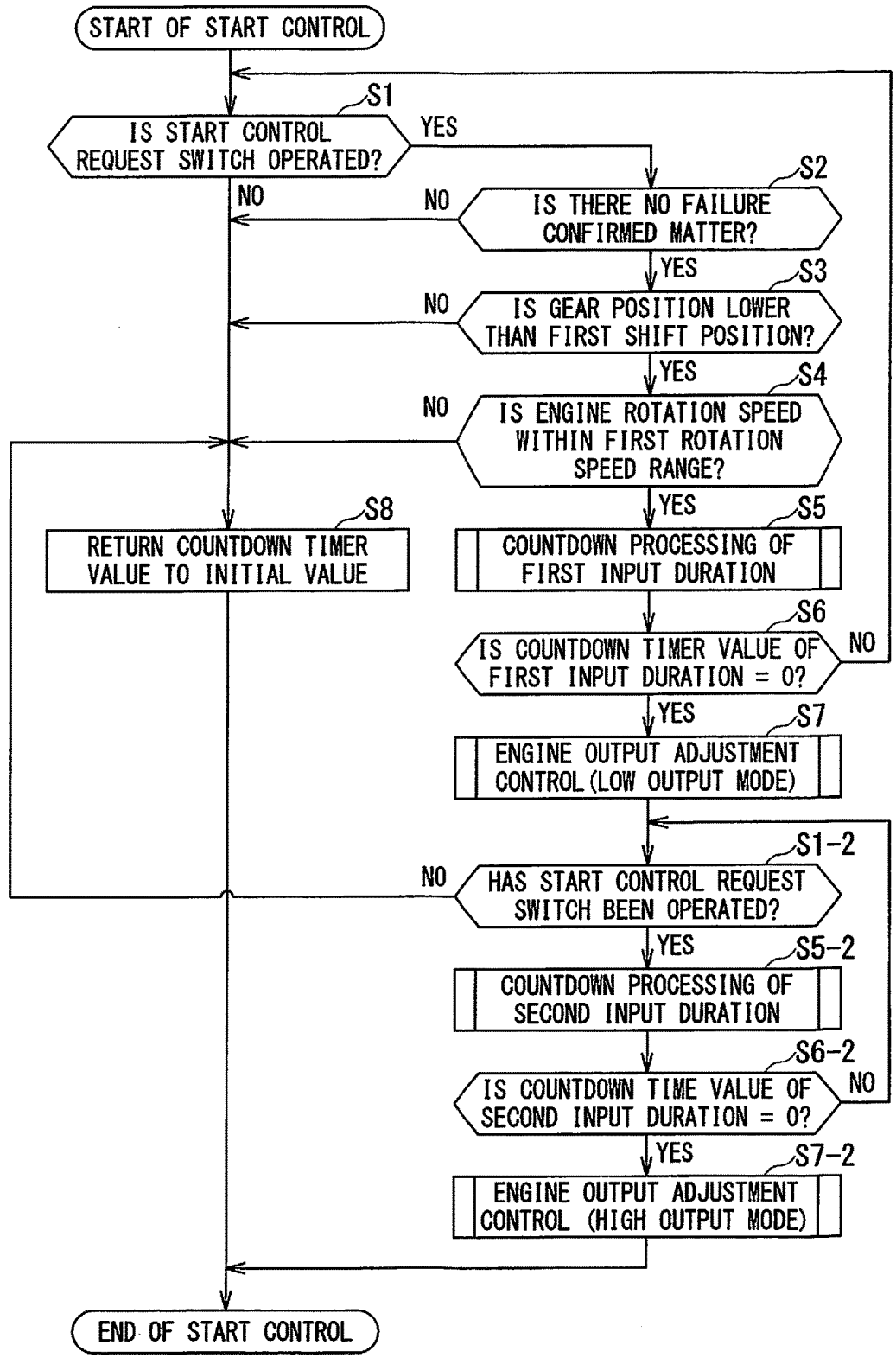
FIG. 6 is a flowchart illustrating start control of the engine output adjustment by the engine controller according to the embodiment of the present invention.

FIG. 6 is a flowchart illustrating start control of the engine output adjustment by the engine controller according to the embodiment of the present invention.

Processing in FIG. 6 determines the condition in a first section in FIG. 5, and if the condition is satisfied, the engine output adjustment control is started.

As illustrated in FIGS. 5 and 6, the start determinator 11 of the engine controller 1 according to this embodiment starts the engine output adjustment control (Step S7) when all the conditions that the start control request switch 16 is subjected to the pressing-down operation (Step S1: Yes), a failure is not confirmed (Step S2: Yes), the shift position GP of the transmission 26 connected to the engine 5 is at a stage lower than a first shift position P1 determined in advance (Step S3: Yes), and the rotation speed Ne of the engine 5 is within a first rotation speed range determined in advance (NthL1≤rotation speed Ne≤NthH1) (Step S4: Yes) are satisfied.

A first position P1 is determined to be a third gear, for example. In this case, Step S3 is satisfied if the gear position GP of the transmission 26 is any one of a first gear, a neutral position, and a second gear.

The first rotation speed range (NthL1≤rotation speed Ne≤NthH1) at Step S4 is a range in which idling of the engine 5 can be confirmed.

Moreover, in order to avoid a mis-operation of the engine output adjustment control and in order to enable selection of a control mode by the single start control request switch 16, the start determinator 11 executes countdown processing of the first input duration Ton1 on a premise of satisfaction of the conditions in Step S1 to Step S4 (Step S5). The start determinator 11 starts the engine output adjustment control (first engine output adjustment control, low output mode) (Step S7) if a countdown timer value of the first input duration Ton1 reaches a zero value (Step S6: Yes)

On the other hand, if the countdown timer value of the first input duration Ton1 does not reach the zero value (Step S6: No), the start determinator 11 does not start the engine output adjustment control but executes the countdown processing (Step S5) if the conditions from Step S1 to Step S4 are satisfied. That is, the start determinator 11 holds start of the engine output adjustment control until predetermined time (the first input duration Ton1) has elapsed since the conditions from Step S1 to Step S4 are satisfied, the start control request switch 16 is subjected to the pressing-down operation, and the vehicle 2 enters an idling state in start standby condition.

Moreover, if even any one of the conditions from Step S1 to Step S4 is not satisfied (Step S1: No, Step S2: No, Step S3: No, Step S4: No), the start determinator 11 initializes the countdown timer value of the first input duration Ton1 (Step S8) and bypasses the engine output adjustment control, that is, finishes the processing without execution.

The start control request switch 16 can be installed individually for each control mode, but in the start determinator 11 of the engine controller 1 according to this embodiment, in order to reduce a weight or a size of the device, the control mode can be selected by the single start control request switch 16, and specifically, the control mode is switched in order by operation time of the start control request switch 16. Thus, after start (Step S7) of the engine output adjustment control (low output mode) which applies the map 28 for a low output suppressing the output of the engine 5 lower than the standard ignition timing which is the first ignition timing correction map, it is confirmed that the start control request switch 16 is still subjected to the pressing-down operation (the pressing-down operation has continued) (Step S1-2: Yes), and with satisfaction of the condition of Step S1-2 as a premise condition, the countdown processing of the second input duration Ton2 is executed (Step S5-2). If the countdown timer value of the second input duration Ton2 reaches the zero value (Step S6-2: Yes), the start determinator 11 starts (Step S7-2) the engine output adjustment control (second engine output adjustment control, high output mode).

On the other hand, if the countdown timer value of the second input duration Ton2 does not reach the zero value (Step S6-2: No), the start determinator 11 continues the low output mode without allowing the high output mode to be started and returns to Step S1-2 again, and if the start control request switch 16 is still subjected to the pressing-down operation (the pressing-down operation has continued), the countdown processing is executed (Step S5-2). That is, the start determinator 11 holds start of the second engine output adjustment control until predetermined time (second input duration Ton2) has elapsed after start of the first engine output adjustment control (Step S7), even if the start control request switch 16 is continuously subjected to the pressing-down operation.

Moreover, if the pressing-down operation on the start control request switch 16 is canceled and the condition at Step S1-2 is not satisfied (Step S1-2: No), the start determinator 11 maintains application of the low output mode without applying the high output mode, initializes (Step S8) the countdown timer value of the first input duration Ton1 and the second input duration Ton2 and finishes the processing.

When the engine controller 1 starts the engine output adjustment control (Step S7 or Step S7-2), it notifies the rider or the assistant that the engine output adjustment control has started by turning-on or flashing the indicator lamp 23 in a pattern corresponding to the low output mode or the high output mode.

In the start control of this embodiment, the examples in which the low output mode and the high output mode provided are illustrated, while a plurality of low output modes with different output characteristics can be provided, a plurality of high output modes with different output characteristics can be provided or the combination of both can be provided.

Figure 7:
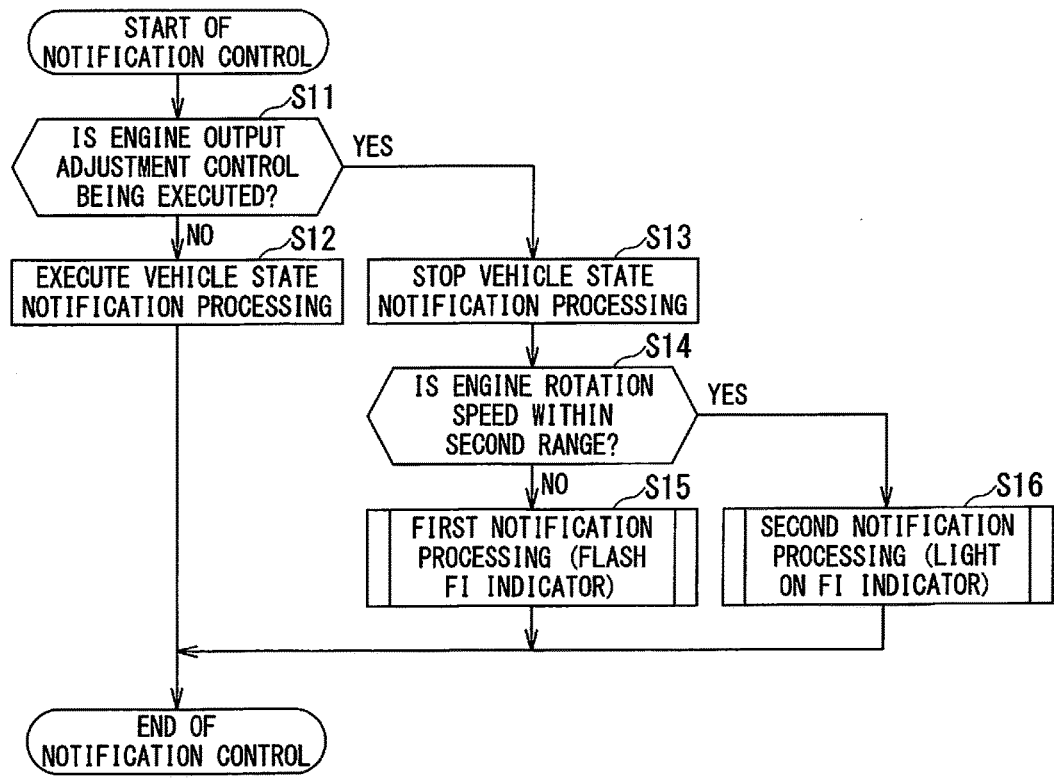
FIG. 7 is a flowchart illustrating notification control by the engine controller according to the embodiment of the present invention.

FIG. 7 is a flowchart illustrating the notification control by the engine controller according to the embodiment of the present invention.

As illustrated in FIG. 7, the engine controller 1 according to this embodiment monitors presence of abnormality of the vehicle 2 at all times, and if the engine output adjustment control is not executed (Step S11: No), the engine controller 1 executes state notification processing of the vehicle 2 (Step S12) by any of turning-off, turning-on, and flashing of the indicator lamp 23 or by means of combination of them. An operation pattern of the indicator lamp 23 in the state notification processing of the vehicle 2 is different from the pattern indicating that the engine output adjustment control is being executed.

On the other hand, the start controller 13 of the engine controller 1 notifies at least a state of the engine output adjustment control and a situation of the rotation speed Ne of the engine 5 which satisfies an execution condition of the engine output adjustment control by the pattern of turning-on or flashing of the indicator lamp 23.

Specifically, the engine controller 1 stops the state notification processing of the vehicle 2 once (Step S13) and monitors the rotation speed Ne of the engine 5 (Step S14) if the engine output adjustment control is executed (Step S11: Yes). Then, if the rotation speed Ne of the engine 5 is not within a second rotation speed range (NthL2≤rotation speed Ne≤NthH2) determined in advance (Step S14: No), the engine controller 1 executes first notification processing by flashing the indicator lamp 23 (Step S15) and notifies the rider or the assistant that the engine output adjustment control is executed and the executed (selected) mode of the control.

On the other hand, if the rotation speed Ne of the engine 5 is within the second rotation speed range (NthL2≤rotation speed Ne≤NthH2) determined in advance (Step S14: Yes), the engine controller 1 turns on the indicator lamp 23 and executes second notification processing (Step S16) and notifies the rider or the assistant that the rotation speed Ne of the engine 5 under the engine output adjustment control is within a recommended start preparation rotation speed range.

The second rotation speed range (NthL2≤rotation speed Ne≤NthH2) is an index when the rider operates the right grip 7c (throttle) at start. If the indicator lamp 23 executes the second notification processing, the rider can know that the rotation speed Ne of the engine 5 is within the second rotation speed range (NthL2≤rotation speed Ne≤NthH2). Then, if the rider further opens the right grip 7c (throttle) and the notification is changed from the second notification processing to the first notification processing, the rider can easily determine whether or not the rotation speed Ne of the engine 5 is in the state within the second rotation speed range (NthL2≤rotation speed Ne≤NthH2) or not. In the case of a race vehicle such as the vehicle 2 which is not provided with a tachometer displaying the rotation speed Ne of the engine 5 or at a race start when a peripheral noise is too large to hear engine sound of the vehicle itself, notification by the indicator lamp 23 is particularly effective.

In the case of the vehicle 2 on which over-rotation prevention control (rev-limiter control) is mounted, if the rotation speed Ne of the engine 5 further rises largely exceeding the second rotation speed range (NthL2≤rotation speed Ne≤NthH2), the over-rotation prevention control of the engine 5 works, and unique vibration occurs and thus, the rider can determine that the rotation speed Ne of the engine 5 reaches a rotation speed at which the over-rotation prevention control works. That is, the rider can determine whether the rotation speed Ne of the engine 5 is located within the predetermined second rotation speed range (NthL2≤rotation speed Ne≤NthH2), or over the predetermined second rotation speed range (NthL2≤rotation speed Ne≤NthH2) but within the range at which the over-rotation prevention control works, or over the range at which the over-rotation prevention control works.

Figure 8:
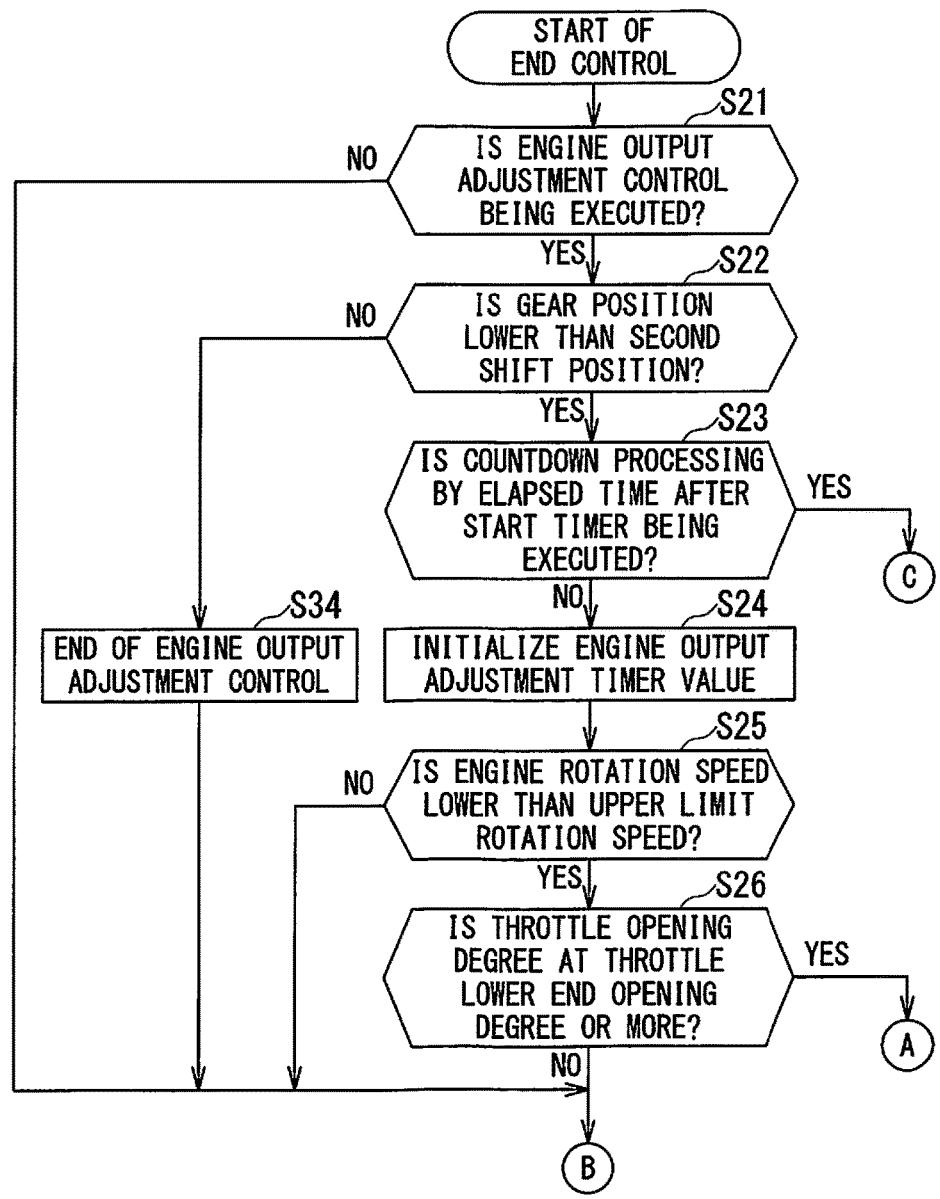
FIG. 8 is a flowchart illustrating end control of the engine output adjustment by the engine controller according to the embodiment of the present invention.
Figure 9:
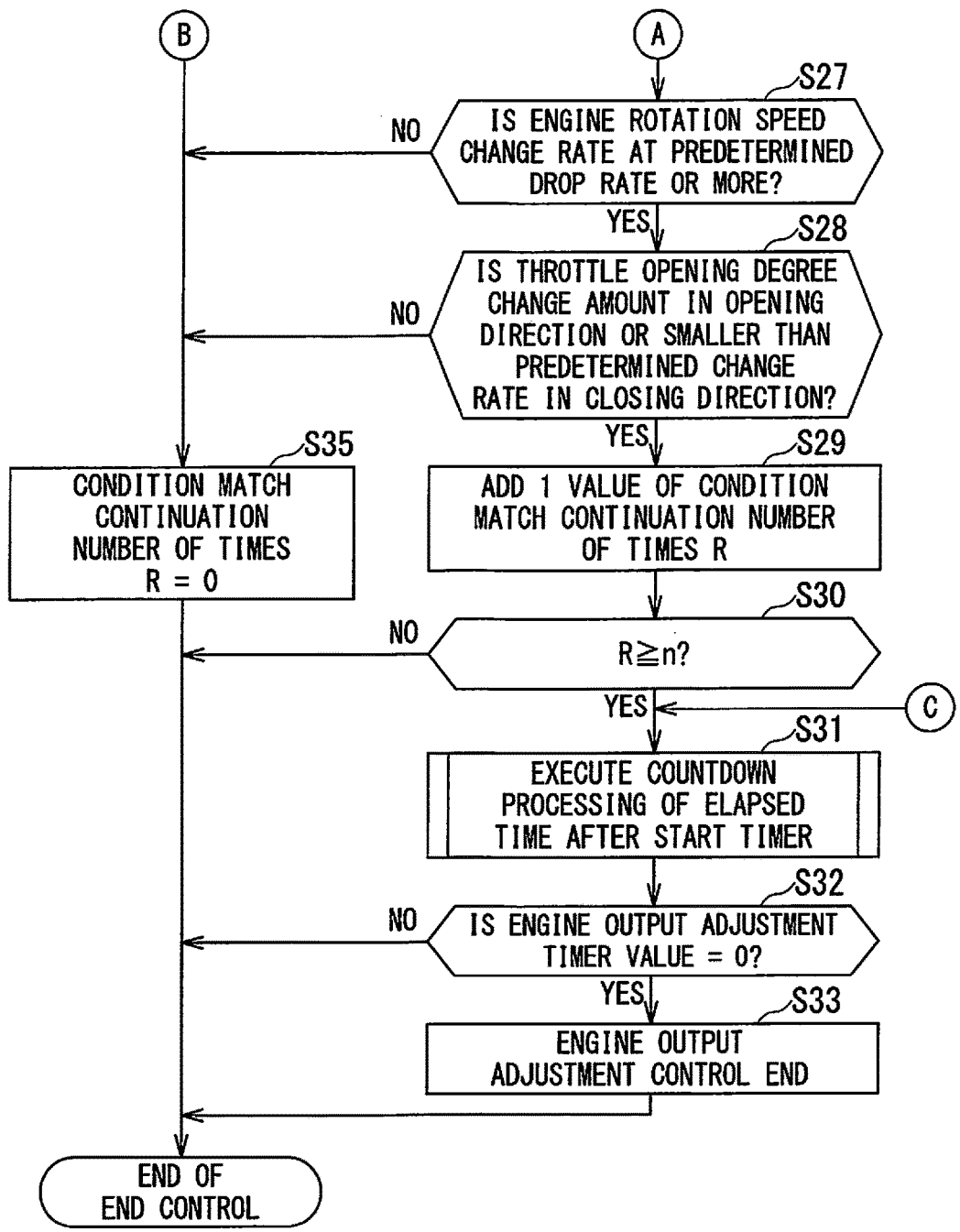
FIG. 9 is a flowchart illustrating the end control of the engine output adjustment by the engine controller according to the embodiment of the present invention.

FIG. 8 and FIG. 9 are flowcharts illustrating end control of the engine output adjustment by the engine controller according to the embodiment of the present invention. FIG. 8 illustrates a first half of the end control of the engine output adjustment, while FIG. 9 illustrates a second half of the end control of the engine output adjustment. FIG. 8 and FIG. 9 are connected by alphabetical symbols A, B, and C described in arrows in the figure.

As illustrated in FIGS. 5, 8, and 9, the start determinator 11 of the engine controller 1 according to this embodiment starts determination (whether or not the vehicle 2 has started) if the predetermined time (first input duration Ton1) has elapsed and the conditions from Step S3 to Step S4 illustrated in FIG. 6 are satisfied. The start determinator 11 determines that the vehicle 2 has started if a change rate ΔNe of the rotation speed Ne of the engine 5 is larger than a drop rate Dr determined in advance.

Moreover, the start determinator 11 determines start of the vehicle 2 if the rotation speed Ne of the engine 5 is lower than an upper limit rotation speed Nes determined in advance. In other words, the start determinator 11 suppresses start determination of the vehicle 2 if the rotation speed Ne of the engine 5 is at the upper limit rotation speed Nes determined in advance or more.

Moreover, the start determinator 11 determines start of the vehicle 2 if the throttle opening degree θ is at a throttle lower limit opening degree Oths determined in advance in accordance with the rotation speed Ne of the engine 5 or more. In other words, the start determinator 11 suppresses determination of start of the vehicle 2 if the throttle opening degree θ is smaller than a throttle lower limit opening degree Oths determined in accordance with the rotation speed Ne of the engine 5 in advance.

Specifically, the start determinator 11 sets the engine output adjustment timer value to predetermined control time Tr determined in advance as an initial value (Step S24) if the conditions that the engine output adjustment control is executed (Step S21: Yes), that the gear position GP of the transmission 26 is at a stage lower than a second gear position P2 determined in advance (Step S22: Yes), and that the countdown processing of the elapsed time after start timer 12 has not been executed (Step S23: No) are all satisfied.

The control time Tr is different depending on the control mode of the engine 5 and longer in the high output mode than in the low output mode. The control time Tr in the low output mode is set to 1.2 seconds, and the control time Tr in the high output mode is set to 4.5 seconds, for example.

Moreover, if all the conditions that the rotation speed Ne of the engine 5 is lower than the upper limit rotation speed Nes determined in advance (Step S25: Yes), the throttle opening degree θ of the engine 5 is at the throttle lower limit opening degree Oths determined in advance in accordance with the rotation speed Ne of the engine 5 or more (Step S26: Yes), the change rate ΔNe of the rotation speed Ne of the engine 5 is at the drop rate Dr determined in advance or more (Step S27: Yes), and the change rate Δθ of the throttle opening degree θ of the engine 5 is in an opening direction or in a closing direction and smaller than a change rate ΔθDr determined in advance (Step S28: Yes) are satisfied, the start determinator 11 adds a 1 value to a condition match continuation number of times R (Step S29). Then, the start determinator 11 holds proceeding to the subsequent processing, that is, the countdown processing of the elapsed time after start timer 12 (Step S31) until the condition match continuation number of times R becomes a count total value n determined in advance or more in order to reliably determine start of the vehicle 2 (Step S30: No). On the other hand, if a condition match continuation number of times R becomes a predetermined count total value n or more (Step S30: Yes), it is determined that the vehicle 2 has started, and the countdown processing of the elapsed time after start timer 12 is executed (Step S31), and if elapsed time Tp reaches the predetermined control time Tr and the engine output adjustment timer value becomes the zero value (Step S32), the engine output adjustment control is finished (Step S33). Though not shown, if the elapsed time Tp reaches the predetermined control time Tr and the low output mode or the high output mode is finished, the start controller 13 gradually brings the control mode to the standard mode and smoothly changes the output of the engine 5 to the standard output state and finishes the engine output adjustment control.

The change rate ΔNe at Step S27 detects a phenomenon in which the rotation speed Ne of the engine 5 lowers by a load of the rear wheel 8 since the clutch (not shown) is to be engaged. By means of an increase of the change rate ΔNe larger than the predetermined drop rate Dr, in other words, by means of a drop of the change rate ΔNe of the rotation speed Ne of the engine 5 larger than the drop rate Dr, the start determinator 11 determines that the vehicle 2 has started.

The start determinator 11 of the engine controller 1 according to this embodiment determines that the clutch is to be engaged and the change rate ΔNe of the rotation speed Ne of the engine 5 temporarily drops larger than the drop rate Dr at Step S27. On the other hand, the start determination can be made by detecting a state of the clutch by using a clutch state detection sensor (not shown) for detecting engagement/disengagement of the clutch. That is, since the determination by the change rate ΔNe of the rotation speed Ne of the engine 5 does not require the clutch state detection sensor, it can contribute to reduction of the weight or size of the vehicle.

Moreover, at Step S28, the phenomenon in which the change rate ΔNe of the rotation speed Ne of the engine 5 drops larger than the drop rate Dr at Step S27, but this detected drop of the rotation speed Ne of the engine 5 prevents misdetermination on the drop of the rotation speed Ne caused by a returning (closing) operation of the right grip 7c (throttle) by the rider. That is, if the rider returns the right grip 7c (throttle) once due to hesitation to start or the like and the engine 5 returns to an idle state again, erroneous execution of the countdown processing of the elapsed time after start timer 12 is prevented.

Moreover, the start determinator 11 practices Step S29 and Step S30 and reliably determines start of the vehicle 2. That is, in FIG. 5, the drop of the rotation speed Ne is schematically illustrated, but the change rate ΔNe detected at Step S27 is a change of the rotation speed Ne in an extremely short period of time and is a change of rotating time per cycle of the crank shaft 25 from the crank rotation pulse generator 17 or a change acquired from comparison with rotating time 1 cycle before the same rotation section of the crank shaft 25 and thus, it is likely that an instantaneous drop of the rotation speed caused by disturbance other than the start operation (clutch operation) is erroneously determined as start. Thus, the start determinator 11 prevents erroneous determination to be started only by the instantaneous drop of the rotation speed caused by the disturbance other than the start operation (clutch operation) and holds proceeding (Step S30: No) to the countdown processing of the elapsed time after start timer 12 (Step S31) until a count total value n determined in advance is reached so that reliability of the rider's estimation on the start operation (clutch operation) increases.

If the friction coefficient of the road surface on which the rear wheel 8 is grounded is extremely small, the rider slightly twists the right grip 7c (throttle), that is, slightly opens the throttle valve 15 in fear of idling of the rear wheel 8 in some cases. In this case, the throttle opening degree θ falls below the throttle lower limit opening degree Oths and the condition match continuation number of times R is not counted, and the routine does not proceed to the countdown processing of the elapsed time after start timer 12 and thus, the state in which the output is adjusted is held (Step S26: No, Step S35).

Moreover, if the gear position GP of the transmission 26 changes to the second position P2 determined in advance or more (Step S22: No), the start control unit 13 finishes the engine output adjustment control (Step S34) even before the elapsed time Tp measured by the elapsed time after start timer 12 reaches the predetermined control time Tr and finishes the processing by initializing the count value of the condition match continuation number of times R (Step S35). That is because it can be determined that the transmission 26 is in a state in which the transmission 26 has been already shifted to a high-speed stage by the rider and the control for start is not needed any more.

The second position P2 is different depending on the control mode of the engine 5 and is set at a gear position which achieves a higher speed in the high output mode than in the low output mode. For example, in the case of the transmission 26 with five speeds, the second position P2 in the low output mode is set to the third speed, the second position P2 in the high output mode to the fourth speed. That is because the higher speed is to be achieved in the high output mode than in the low output mode.

If the start of the vehicle 2 is determined, and the countdown processing of the elapsed time after start timer 12 is executed (Step S31), determination that the countdown processing of the elapsed time after start timer 12 is being executed is made at Step S23 (Step S23: Yes), and the states of the rotation speed Ne of the engine 5 (Step S25) and the throttle opening degree θ of the engine 5 (Step S26) which are premises for determination at Step S27 do not affect the countdown processing of the elapsed time after start timer 12.

Here, if a fully-closed state of the throttle opening degree θ of the engine 5 (a state of substantially fully closed including an opening degree state close to fully closed) reaches predetermined fully closed duration determined in advance, the start controller 13 may finish the engine output adjustment control even before the elapsed time Tp measured by the elapsed time after start timer 12 reaches the predetermined control time Tr (not shown).

Moreover, the start controller 13 may also finish the engine output adjustment control if the start control request switch 16 is subjected to the pressing-down operation during execution of the engine output adjustment control (not shown).

The start controller 13 may also finish the engine output adjustment control if the predetermined total control time T or 180 seconds, for example, has elapsed since the first input duration Ton1 (not shown). In this case, the start controller 13 can finish the engine output adjustment control of the vehicle 2 which has started without being able to detect the change rate ΔNe of the rotation speed Ne of the engine 5 larger than the drop rate Dr.

Moreover, the start controller 13 notifies the rider that the engine output adjustment control is being executed by flashing the indicator lamp 23 in a predetermined pattern determined in advance for each control mode during execution of the engine output adjustment control. Particularly, in the case of the vehicle 2 not provided with a tachometer for displaying the rotation speed Ne of the engine 5, it is difficult to know whether or not the rotation speed Ne of the engine 5 at start is within the second rotation speed range (NthL2≤rotation speed Ne≤NthH2) and thus, the engine controller 1 notifies that the rotation speed Ne of the engine 5 is within the second rotation speed range (NthL2≤rotation speed Ne≤NthH2) during execution of the engine output adjustment control by lighting the indicator lamp 23.

Moreover, instead of notification that the rotation speed Ne of the engine 5 is within the second rotation speed range (NthL2≤rotation speed Ne≤NthH2), the engine controller 1 may change a flashing cycle of the indicator lamp 23 by correlating it with the rotation speed Ne of the engine 5. The rider can estimate the rotation speed Ne of the engine 5 from the flashing cycle of the indicator lamp 23.

The notification relating to execution of the engine output adjustment control, the notification that the rotation speed Ne of the engine 5 is within the second rotation speed range (NthL2≤rotation speed Ne≤NthH2), and the flashing notification of the rotation speed Ne of the engine 5 may be made by providing a light emitting device such as an LED, a light bulb and the like separately from the indicator lamp 23.

Figure 10:
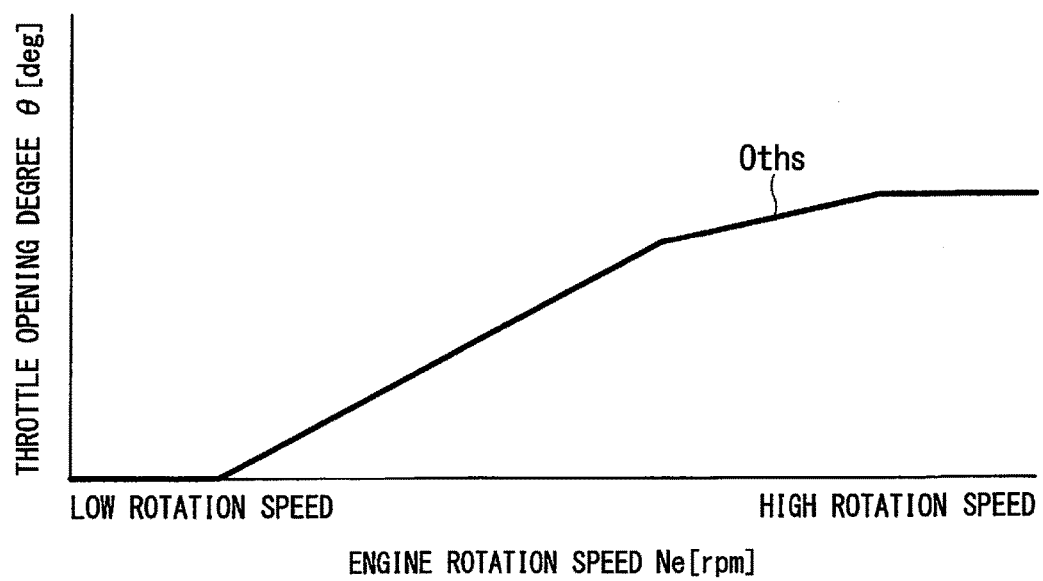
FIG. 10 is a view illustrating setting contents of a throttle lower limit opening degree in the engine controller according to the embodiment of the present invention.

FIG. 10 is a view illustrating setting (Step S26) contents of the throttle lower limit opening degree in the engine controller according to the embodiment of the present invention.

As illustrated in FIG. 10, the throttle lower limit opening degree Oths of the engine controller 1 according to this embodiment is determined in accordance with the rotation speed Ne of the engine 5 and is set to be constant at a lower opening degree in a low rotation speed region of the rotation speed Ne of the engine 5 and to be constant at a higher opening degree in a high rotation speed region of the rotation speed Ne of the engine 5, but a set opening degree becomes larger with a rise of the rotation speed Ne of the engine 5 in a wide rotation region from the low rotation region to the high rotation region. The throttle lower limit opening degree Oths is set to a side where the throttle opening degree θ is opened more with the rotation speed Ne of the same engine 5 as compared with a curve indicating a relation between the rotation speed Ne of the engine 5 and the throttle opening degree θ when the right grip 7c (throttle) is gradually opened in a non-load state (clutch disengaged state).

Figure 11:
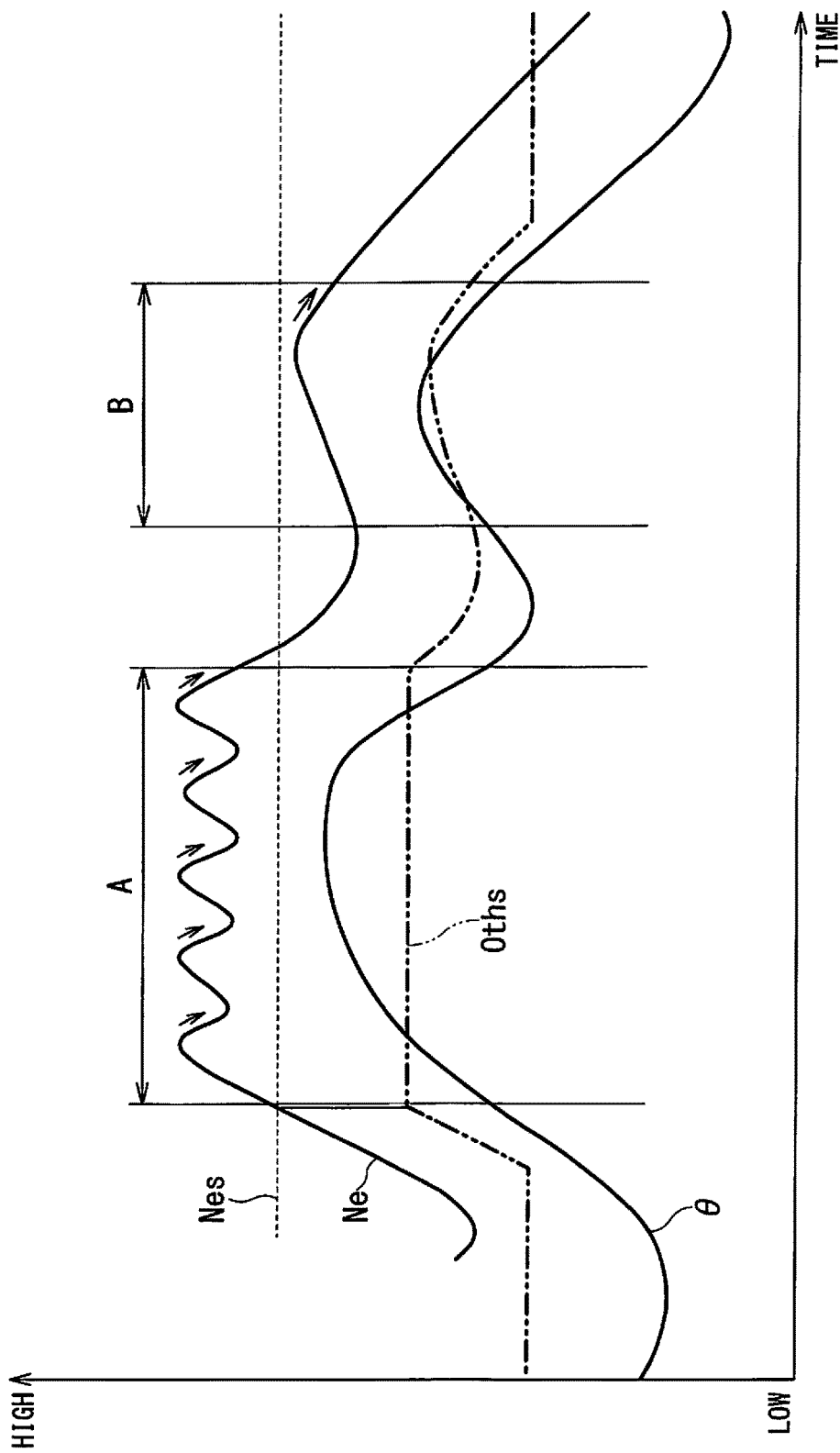
FIG. 11 is a view illustrating an example of changes of a throttle opening degree and an engine rotation speed in the engine controller according to the embodiment of the present invention.

FIG. 11 is a view illustrating an example of changes of the throttle opening degree and the engine rotation speed in the engine controller according to the embodiment of the present invention.

The start determinator 11 of the engine controller 1 according to this embodiment detects at step S27 that the clutch (not shown) is to be engaged and the change rate ΔNe of the rotation speed Ne of the engine 5 temporarily drops more largely than the drop rate Dr and determines it as start, but the engine controller 1 incorporates an over-rotation prevention control (a rev-limiter control) for protecting the engine 5 by controlling such that the rotation speed Ne of the engine 5 does not become too high in order to prevent over-rotation of the engine 5 in some cases.

In this case, the engine controller 1 according to this embodiment lowers (downward arrow in FIG. 11) the rotation speed Ne of the engine 5 when the over-rotation prevention control operates as illustrated in FIG. 11 (section A in FIG. 11). If the change rate ΔNe of the rotation speed Ne of the engine 5 lowers larger than the drop rate Dr determined in advance by the over-rotation prevention control, there is a concern that the start determinator 11 erroneously determines that the vehicle 2 has started.

Thus, by monitoring that the rotation speed Ne of the engine 5 is lower than the upper limit rotation speed Nes determined in advance (Step S25), the engine controller 1 according to this embodiment avoids mis-determination on start of the vehicle 2 by the start determinator 11 even if the change rate of the rotation speed Ne of the engine 5 lowers more largely than the drop rate Dr determined in advance by the over-rotation prevention control. That is, in order that a fluctuation range of the rotation speed Ne of the engine 5 by the over-rotation prevention control is not used for start determination, an upper limit rotation speed Nes is set to a lower rotation side than the fluctuation range of the rotation speed Ne of the engine 5 by the over-rotation prevention control.

Moreover, if the rider performs an operation of increasing or decreasing the throttle opening degree θ (section B in FIG. 11) by twisting the right grip 7c (throttle) like so-called idling, the engine controller 1 changes the rotation speed Ne of the engine 5 (downward arrow in FIG. 11). Then, if the change rate ΔNe of the rotation speed Ne of the engine 5 drops more largely than the drop rate Dr determined in advance by the right grip 7c (throttle) operation, there is a concern that the start determinator 11 mis-determines that the vehicle 2 has started.

Thus, for start determination the engine controller 1 according to this embodiment suppress the start determination of the vehicle 2 if the throttle opening degree θ becomes smaller than the throttle lower limit opening degree Oths (Step S26) and on the condition that the change rate Δθ of the throttle opening degree θ of the engine 5 is in the opening direction or in the closing direction and is smaller than the change rate ΔθDr determined in advance (Step S28), the engine controller 1 avoids the mis-determination on start of the vehicle 2 by the right grip 7c (throttle) operation and infers the rider's will to start.

The engine controller 1 according to this embodiment can easily exert acceleration performances of the vehicle 2 itself by executing the engine output adjustment control until the elapsed time Tp measured by the elapsed time after start timer 12 reaches the predetermined control time Tr determined in advance without forcing mental strain to the rider for the excessive engine output adjustment operation (control operation of a driving force by a clutch operation and a throttle operation) at the start.

Moreover, the engine controller 1 according to this embodiment can determine start of the vehicle 2 by monitoring the change rate ΔNe of the rotation speed Ne of the engine 5 and detect start of the vehicle 2 with accuracy and finish the engine output adjustment control in predetermined time after start since it executes the engine output adjustment control. After the predetermined time has elapsed, the acceleration performances of the vehicle 2 itself can be easily exerted by applying the engine output adjustment control only for required time (predetermined time after start) immediately after the start without interfering with acceleration or running of the vehicle 2.

Moreover, the engine controller 1 according to this embodiment can determine start of the vehicle 2 more accurately even for a vehicle equipped with the over-rotation prevention control by suppressing start determination of the vehicle 2 if the rotation speed Ne of the engine 5 is at the upper limit rotation speed Nes or more.

Furthermore, the engine controller 1 according to this embodiment can avoid mis-determination on start of the vehicle 2 by the right grip 7c (throttle) operation by suppressing start determination of the vehicle 2 if the throttle opening degree θ of the engine 5 is smaller than the throttle lower limit opening degree Oths determined in accordance with the rotation speed Ne of the engine 5.

Moreover, the engine controller 1 according to this embodiment monitors the condition match continuation number of times R (Step S29, Step S30) and thus, even if the throttle opening degree θ temporarily becomes the start preparation opening degree Oths or more, the condition match continuation number of times R is not added if the throttle opening degree θ becomes smaller than the start preparation opening degree Oths after that, and thus, proceeding to the countdown processing of the elapsed time after start timer 12 is avoided, and the engine output adjustment state can be continued.

Moreover, the engine controller 1 according to this embodiment can immediately exert running performances of the vehicle 2 itself at timing when the rider smoothly accelerates the vehicle 2 and reaches normal running by finishing the engine output adjustment control if the gear position GP of the transmission 26 changes to the predetermined second position P2 determined in advance or more even before the elapsed time Tp measured by the elapsed time after start timer 12 reaches the predetermined control time Tr. That is, the rider can finish the engine output adjustment control by an intentional shift-up operation.

Furthermore, the engine controller 1 according to this embodiment can immediately withdraw the running performances of the vehicle 2 itself in a situation in which the throttle is closed in order to quickly enter a corner after start of the vehicle 2 in a race scene or the like by finishing the engine output adjustment control even before the elapsed time Tp counted by the elapsed time after start timer 12 reaches the predetermined control time Tr if the fully closed state of the throttle opening degree θ of the engine 5 reaches the predetermined fully closed duration determined in advance. That is, the rider can finish the control by an intentional right grip 7c (throttle) operation.

Moreover, the engine controller 1 according to this embodiment can notify the rider or the assistant that the engine rotation speed Ne is an appropriate engine rotation speed to which the engine output adjustment control is applied by notifying the state of the selected mode of the engine output adjustment control, the situation of the rotation speed Ne of the engine 5 satisfying the execution condition of the engine output adjustment control and the like through lighting-on and flashing of the indicator lamp 23. That is, the engine controller 1 according to this embodiment can allow the engine output adjustment control to effectively function. Moreover, the engine controller 1 according to this embodiment can constitute an inexpensive system by notification control using the indicator lamp 23 without requiring a device for displaying the rotation speed Ne of the engine 5 such as a tachometer.

Moreover, the engine controller 1 according to this embodiment can be applied to start on a bad road and start on a slope by various motorcycles by providing the start control request switch 16 for switching start determination conditions so as to increase usability.

Therefore, according to the engine controller 1 of the present invention, the operation at start of the vehicle 2 can be made easily without giving mental strain for canceling the start control to the rider.

Moreover, according to the engine controller 1 of the present invention, start of the vehicle 2 can be determined with accuracy.

Furthermore, according to the engine controller 1 of the present invention, the engine output adjustment control at start is convenient to use to meet the requirement of the rider.

REFERENCE SIGNS LIST

1 engine controller
2 vehicle
3 vehicle body
5 engine
6 front wheel
7 steering mechanism
7a handle bar
7b left grip
7c right grip
8 rear wheel
9 swing arm
11 start determinator
12 elapsed time after start timer
13 start controller
15 throttle valve
16 start control request switch
17 crank rotation pulse generator
18 throttle opening degree sensor
19 gear position sensor
21 igniter
22 injector
23 indicator lamp
25 crank shaft
26 transmission
27 ignition timing correction map
28 map for low output
29 map for high output

The invention claimed is:
1. An engine controller for a vehicle, the engine controller comprising:
    a start determinator for determining whether or not the vehicle has been started;

an elapsed time after start timer for measuring elapsed time since start of the vehicle determined by the start determinator; and a start controller for adjusting an engine output until the elapsed time measured by the elapsed time after start timer reaches a pre-determined control time in response to the start determinator determining that the vehicle has been started, wherein the start determinator determines whether the vehicle has started in response to determining whether a drop rate of the engine rotation speed is larger than a pre-determined drop rate, and wherein the start determinator suppresses the start determination of the vehicle in response to a determination that the engine rotation speed has reached or is over a pre-determined upper limit rotation speed.

2. The engine controller according to claim 1, wherein the start determinator starts the determination in response to determining, based on conditions whether a start control request switch has been operated, provided that a gear position of a transmission connected to the engine is at a stage lower than a gear position determined in advance and provided that a rotation speed of the engine is within a pre-determined rotation speed range.

3. The engine controller of claim 1, wherein
the start determinator suppresses the start determination of the vehicle in response to a determination that a throttle opening degree of the engine is smaller than a pre-determined throttle lower limit opening degree in accordance with the engine rotation speed.

4. The engine controller of claim 1, wherein, in response to a gear position of the transmission connected to the engine changing to a pre-determined gear position, the start controller finishes the adjustment control for adjusting the engine output prior to the elapsed time measured by the elapsed time after start timer reaching the control time.

5. The engine controller of claim 1, wherein, in response to a state in which a throttle opening degree of the engine becomes substantially fully closed reaching a pre-determined fully-closed duration, the start controller finishes the adjustment control for adjusting the engine output prior to the elapsed time measured by the elapsed time after start timer reaching the control time.

6. The engine controller of claim 1, wherein the engine controller has a plurality of correction maps for adjusting the engine output and the start controller selects one of the plurality of correction maps in accordance with an operation on the start control request switch and sets the control time measured by the elapsed time after start timer.

7. The engine controller of claim 1, wherein the start controller notifies at least one of a state of the engine output adjustment control for adjusting the engine output and a situation of a rotation speed of the engine which satisfies an execution condition of the engine output adjustment control by a pattern of turning-on or flashing of an indicator lamp.

* * * * *